US005411780A

United States Patent [19]

Kaefer

[11] Patent Number: 5,411,780

[45] Date of Patent: May 2, 1995

[54] DECORATIVE APPARATUS WITH INTERCONNECTABLE ELEMENTS

[76] Inventor: Pamela A. Kaefer, 1042 Vernal St., Manteca, Calif. 95336

[21] Appl. No.: 968,395

[22] Filed: Oct. 29, 1992

[51] Int. Cl.[6] ..................... B32B 9/00

[52] U.S. Cl. ..................... 428/38; 428/45; 428/49; 428/166; 156/63; 52/311.3; 52/316; 52/663

[58] Field of Search ..................... 428/38, 45, 49, 57, 428/58, 192, 166; 52/311, 663, 316; 156/63

[56] References Cited

U.S. PATENT DOCUMENTS

| | | | |
|---|---|---|---|
| 260,559 | 7/1882 | Fowler, Jr. | 428/38 |
| 3,183,140 | 5/1965 | Gibson, Jr. | 428/38 |
| 3,512,320 | 5/1970 | Ferron et al. | 428/38 |
| 3,676,920 | 7/1972 | Pilditch | 428/38 |
| 4,022,435 | 5/1977 | Glass | 428/38 |
| 4,252,847 | 2/1981 | DelGrande | 428/38 |
| 4,335,170 | 6/1982 | Butler | 428/38 |
| 4,619,850 | 10/1986 | Charlton | 428/38 |
| 4,722,158 | 2/1988 | Urdaneta | 52/316 |

FOREIGN PATENT DOCUMENTS

| | | | |
|---|---|---|---|
| 15611 | of 1898 | United Kingdom | 428/38 |

*Primary Examiner*—Patrick J. Ryan
*Assistant Examiner*—Abraham Bahta
*Attorney, Agent, or Firm*—Thomas M. Freiburger

[57] ABSTRACT

A series of stained glass modules and connectors allow arbitrary decorative apparatus assemblies to be formed. The apparatus may be connected to any structure capable of supporting the weight of the assembled modules. Connectors are formed of a strong pliable material shaped in a decorative manner. Some connectors are permanently attached to decorative modules, allowing the addition of other modules. Arrays of interconnected modules may be hung in openings or adjacent to windows, simulating a traditional stained glass assembly.

4 Claims, 6 Drawing Sheets

DECORATIVE APPARATUS WITH INTERCONNECTABLE ELEMENTS

BACKGROUND OF THE INVENTION

This invention relates to stained glass displays, specifically individual modules which can be removably joined together to form a complete decorative scene.

For a millennia artists and craftsmen have created stained glass displays with the objective of decorating openings with religious or artistic designs.

Techniques for assembling stained glass displays have changed little from medieval times through today. These techniques share common traits including the use of either lead, zinc, or brass came, or copper foil and solder to join various sizes, shapes, and colors of cut glass thereby creating a decorative glass display.

Completed displays are installed either in place of a simple window, placed against an existing window, or hung freely within an opening. A professional is usually required for proper installation. The common method of "free-hanging" lightweight windows, or "suncatchers" as they are sometimes called, is to attach a hanger to each side or center of the finished suncatcher, to which chain or fishing line can be attached, then hung from an appropriate fastener. For larger, heavier displays the standard would be to install the display in a frame, then hang the frame as desired.

Once a window or suncatcher is completed the design and size are final, for all intents and purposes.

If any part of a display should break, the complete display needs to be taken for professional repair, which is often expensive and time consuming.

There have been several decorative edge foils and bandings introduced to enhance the final product appearance but they have not allowed connecting additional modules.

U.S. Pat. No. 4,335,170 to Butler (1980) discloses a system which allows a portion of a window or opening to be decorated to resemble stained glass, but needs professional application and is a permanent addition which must be applied to a pane of glass or plastic.

The apparatus disclosed in U.S. Pat. No. 4,619,850 to Charlton (1985) also allows a portion of a window or opening to be decorated with a leaded-glass look but also requires professional installation and involves bonding to the glass.

U.S. Pat. No. 4,722,158 to Urdaneta (1984) describes a system of individual modules which can be fitted together forming frame-like borders or panels requiring inner spaces to be filled with materials thereby adding an extra material to which glass must be attached. These frame-like borders do not allow harmonious continuance of a scene.

Stained glass apparatus heretofore have suffered from a number of disadvantages:

(a) A stained glass window is expensive and must be completed before installation. The window needs precise measurements if it is to completely fill an opening since even "standard" openings vary greatly.

(b) There is a large percentage waste factor in glass design due to cutting limitations. Before my invention, in order to fill an opening with a complete design, a solid window was necessary requiring blank or background spaces in the design to use clear glass for fabrication.

(c) The colors of a stained glass window remain final. It would be expensive and impractical to try to replace colors if desired and would require a professional.

(d) The design of a stained glass window is final. There is no practical procedure to change the design once it is fabricated.

(e) The larger the stained glass apparatus is, the more susceptible it is to breakage and would require disposal or expensive professional repair.

(f) "Suncatchers" are limited to hanging only at the angle determined by the placement of their hanger and do not permit the addition of other apparatus to themselves.

(g) Corner apparatus, as shown in traditional stained glass books, are final in design and do not allow additional attachments to themselves.

(h) Traditional installation methods do not permit a flush mount of an apparatus to an arbitrary portion of an opening.

OBJECTS AND ADVANTAGES

Accordingly, several objects and advantages of this invention are:

(a) it provides an affordable alternative to consumers which allows them to purchase individual stained glass modules at separate times which may be easily installed alone or connected to each other to form a decorative scene in any sized opening.

(b) the invention eliminates some of the glass material cost by allowing a complete scene which does not require background glass.

(c) the system allows consumers the option to change colors by simply replacing an old module with a new module. The old modules can then be utilized in a new location.

(d) a design may be continually changed by adding, subtracting or rearranging individual modules.

(e) individual modules are lighter in weight and therefore less subject to breakage than a complete window. If a piece is broken the consumer can simply replace that piece or re-design the scene without significant expense.

(f) the permanently affixed connector on the individual modules allows modules specific angle placement, adding more depth and dimension to apparatus, as well as forming a decorative means to add additional modules.

(g) corner modules are designed to be installed easily by the consumer with a suitable fastener. Strategic placement of connectors add strength, decoration and a means to add an additional module.

(h) the use of mounting brackets that encase each outer edge of corner and border modules allows a flush installation which will also support additional modules as desired.

Further objects and advantages of the invention include the flexibility of attachment which assures success of the final design because of the ease with which modules can be rearranged.

While corner modules need a fastener to be attached in an opening, individual modules may be hung by simply hooking over virtually any sturdy point of attachment, including but not limited to mirrors, planters, doors, lamps and shades, picture frames, or simply on a wall with a fastener, such as a nail or screw.

With a slight adjustment to permanently affixed connectors, individual modules can be utilized in different formats, such as the butterfly in FIGS. 11*a* and 11*b*.

Vines and individual connectors are also used for decorative extensions and specific positioning of modules as desired.

FIG. *7a* shows in perspective an alternative embodiment of a mounting bracket.

Figure 8:
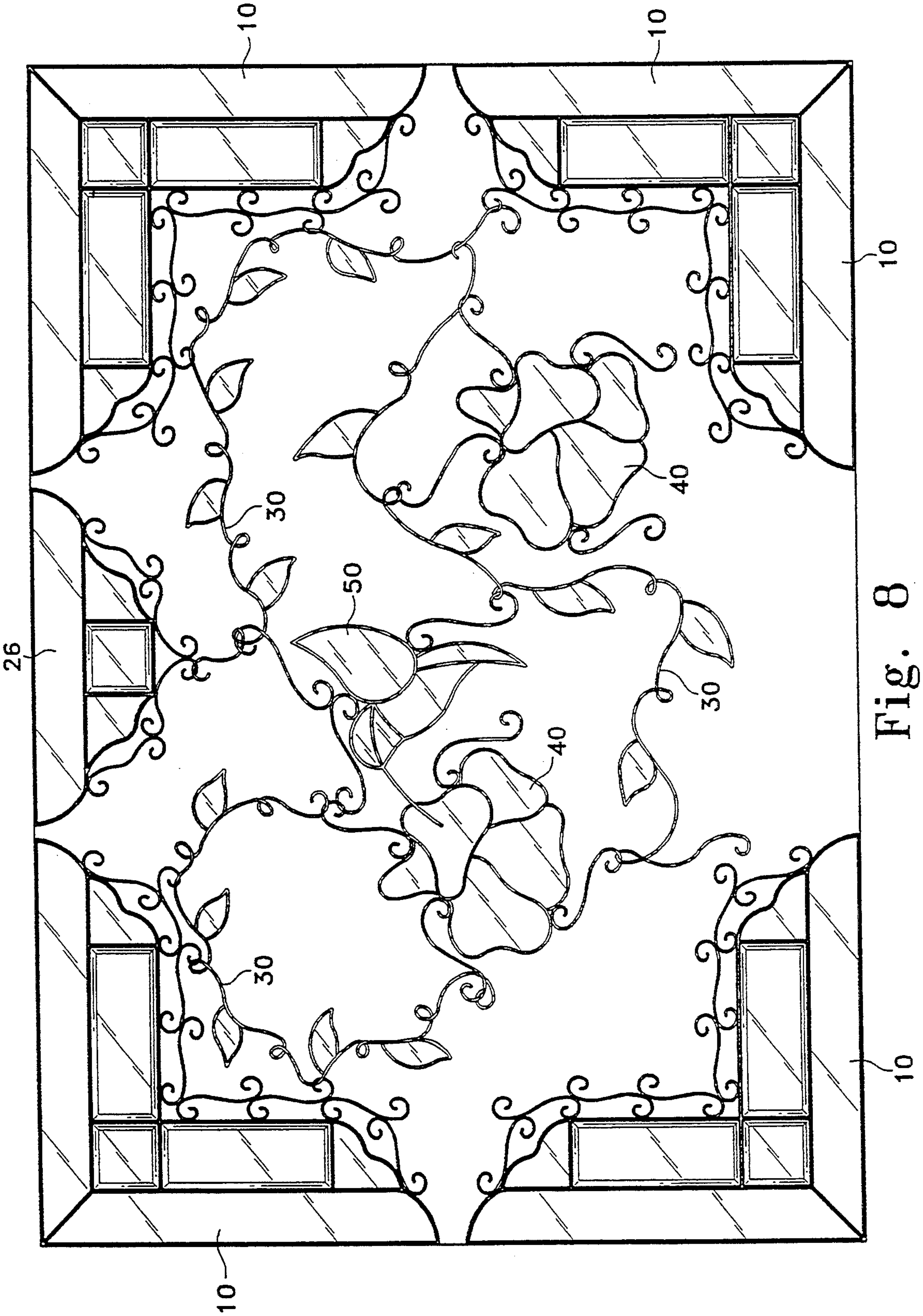

FIG. 8 is a front elevation view of a preferred embodiment of a completed modular assembly.

Figure 9:
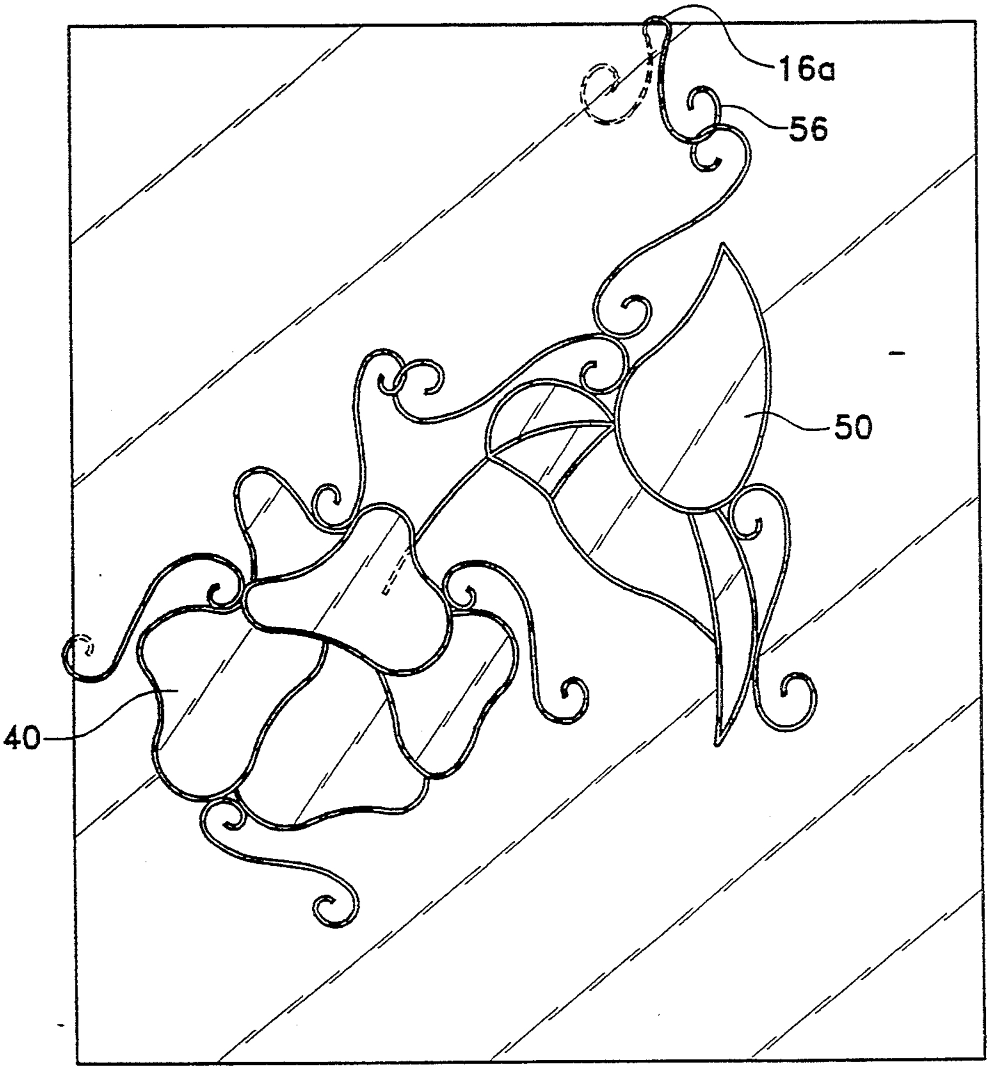

FIG. 9 is a front view of a preferred embodiment of several modules connected and mounted on a mirror.

Figure 10:
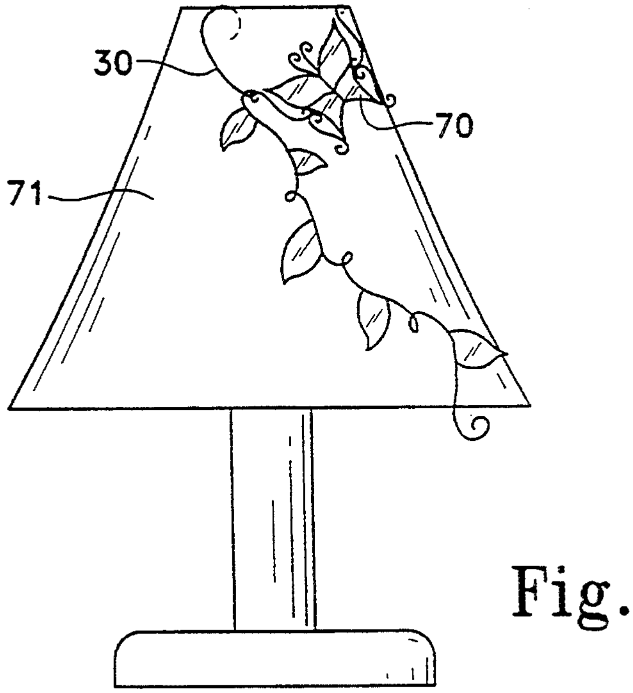

FIG. 10 illustrates a preferred embodiment of modules mounted on a lamp shade.

Figure 11A:
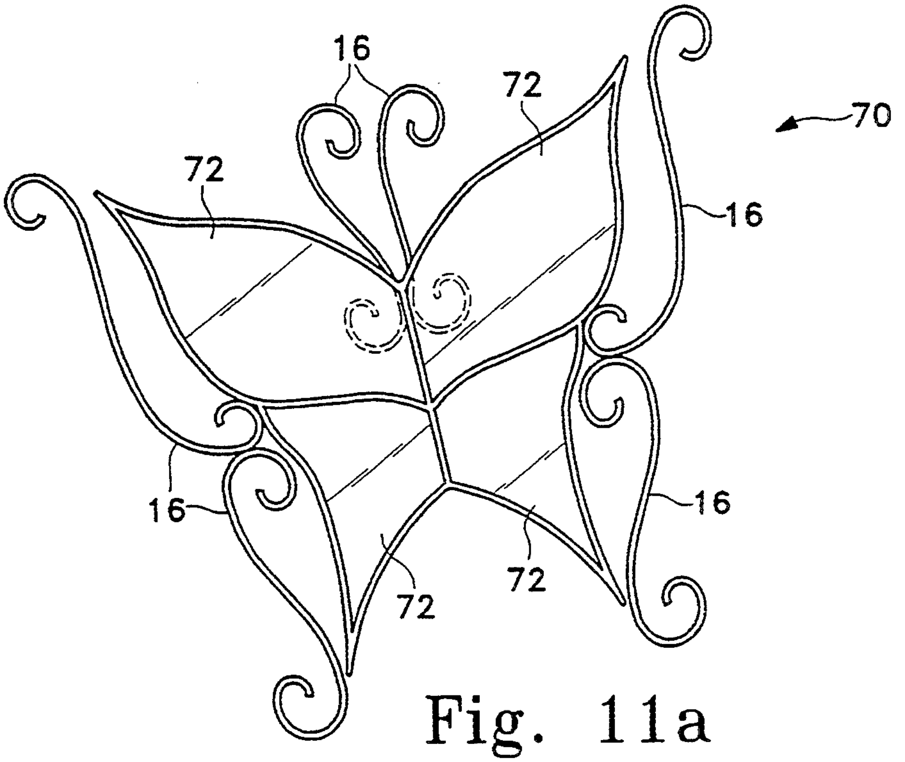
Figure 11B:
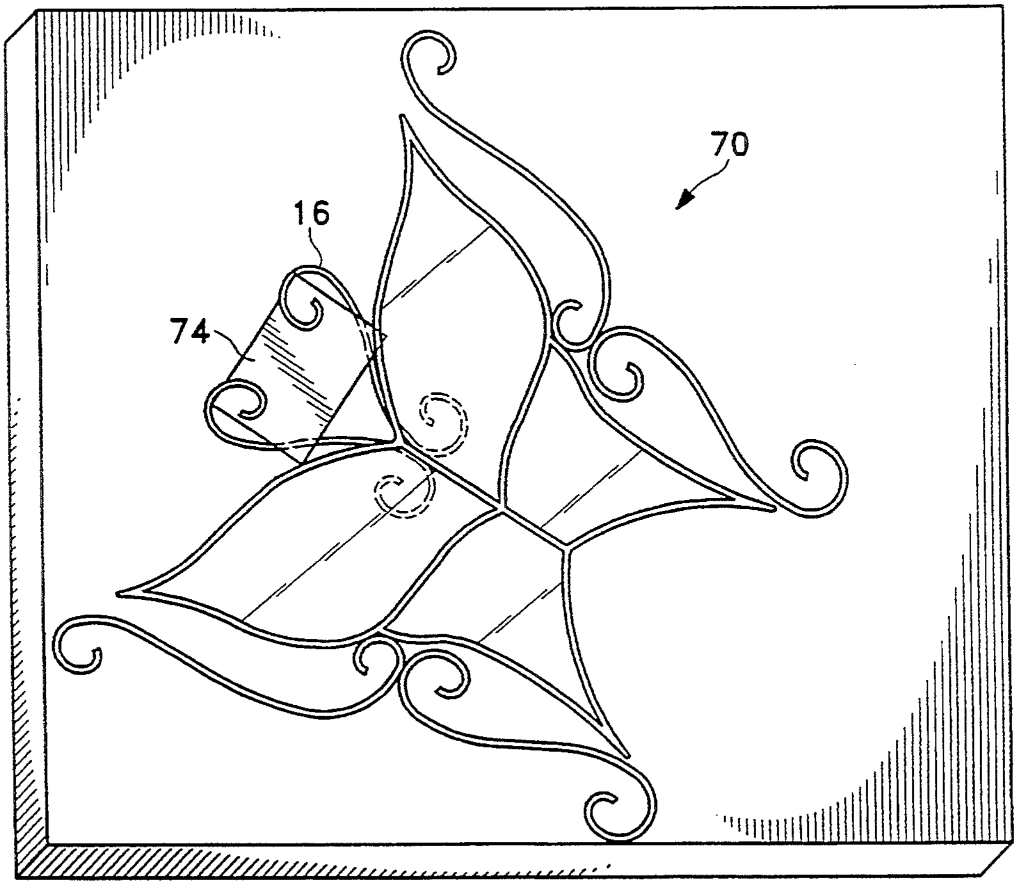

FIGS. 11*a* and 11*b* are frontal views of a preferred embodiment of a butterfly module before and after some connectors are bent to adapt them to a particular application.

DESCRIPTION OF PREFERRED EMBODIMENTS

Figure 1:
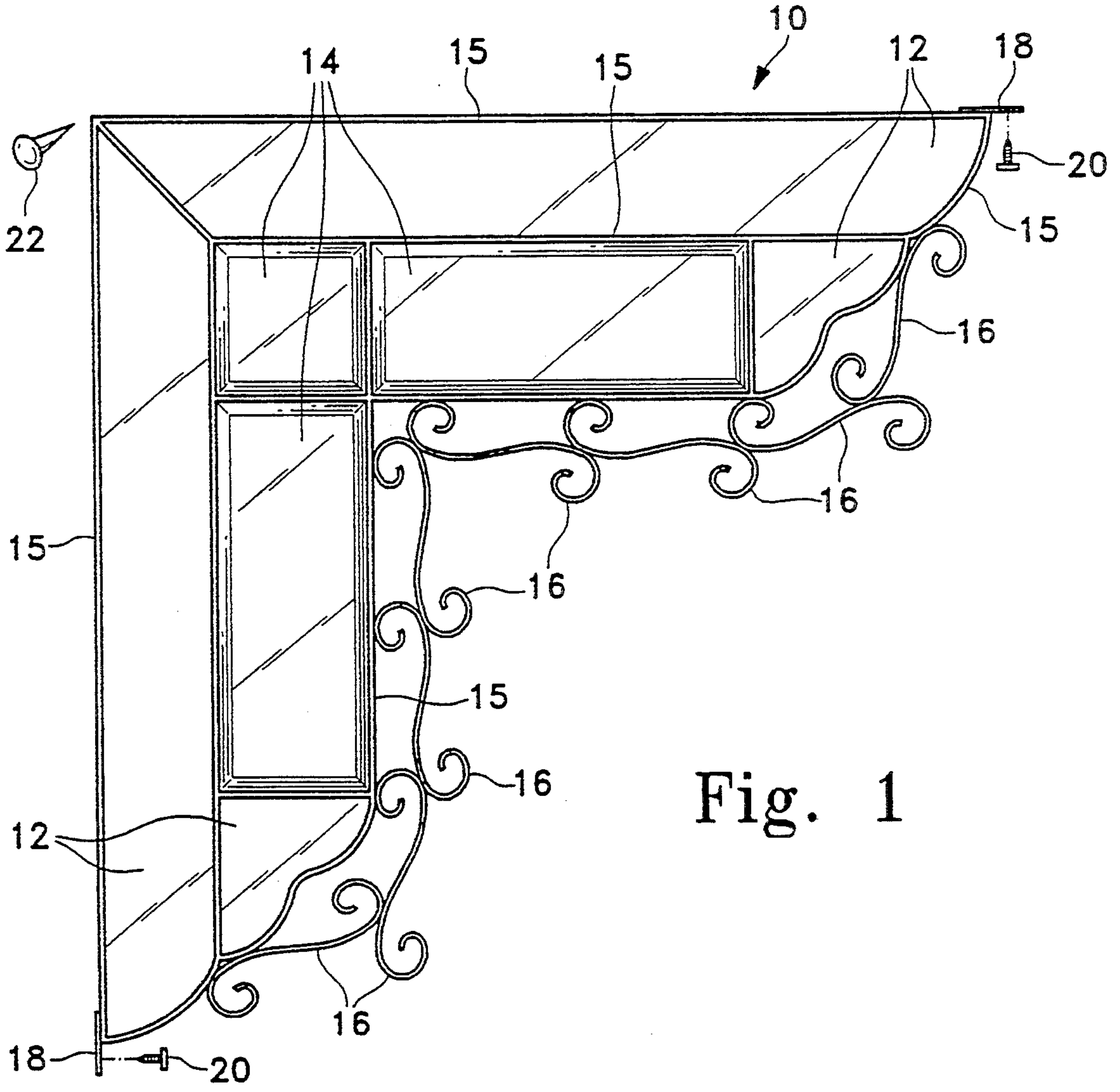
FIG. 1 is a front view of a preferred embodiment of a corner module.

A sample corner module embodiment is illustrated in FIG. 1 comprising four pieces of glass 12 and three bevel glass pieces 14 which are assembled together in an L-shape using any traditional means accepted in the industry (e.g. soldered lead channel, soldered metal foil border, etc., shown as borders 15 in FIG. 1). These glass pieces serve as feature elements of the corner module. Eight connectors 16, at various locations, are permanently attached to this particular corner module 10 and to each other at joints to form a decorative appearance and the means to add on other modules. A mounting bracket 18 with an eyelet (not seen in FIG. 1) is attached to each outer edge of the corner module 10 which will allow the corner module to be secured in any desirable location using a suitable fastener 20, such as a screw. A suitable wedge 22, such as an upholstery tack, may be secured into a desired location at one or both sides of the inner corner of the corner module to keep the module from swinging freely. The corner module 10 acts as a mounting module in an embodiment of the system of the invention.

To install a corner module 10 the consumer would hold the module in the desired location while inserting a suitable fastener 20 through the hole in each of the mounting brackets 18 and into the area of attachment. While still holding the module, a suitable wedge 22 is used to secure the inner corner by inserting the wedge far enough into the area of attachment to secure the wedge, leaving the portion exposed so as to touch the inner edge of the corner to prevent movement. The procedure is repeated on the backside of the inner corner unless the corner module is being installed in an area where the back is already supported, such as against an existing window.

Figure 2:
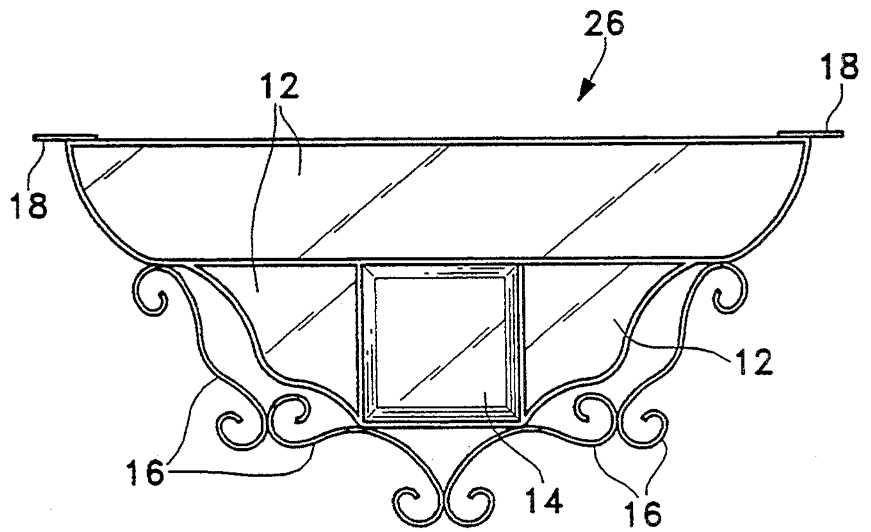
FIG. 2 is a front view of a preferred embodiment of a center module.

FIG. 2 illustrates a sample embodiment of a center module 26 comprised of three pieces of glass 12 and one bevel 14 assembled using any traditional means. The center module is another mounting module. Six connectors 16 are permanently attached to the center module and to each other at joints to form a decorative appearance and the means to add on additional modules. A mounting bracket as in FIG. 7 or FIG. *7a* is attached to each end edge to allow the center module to be secured in the desired location.

A center module 26 is installed the same as a corner module except there is no need for a wedge 22.

Figure 3:
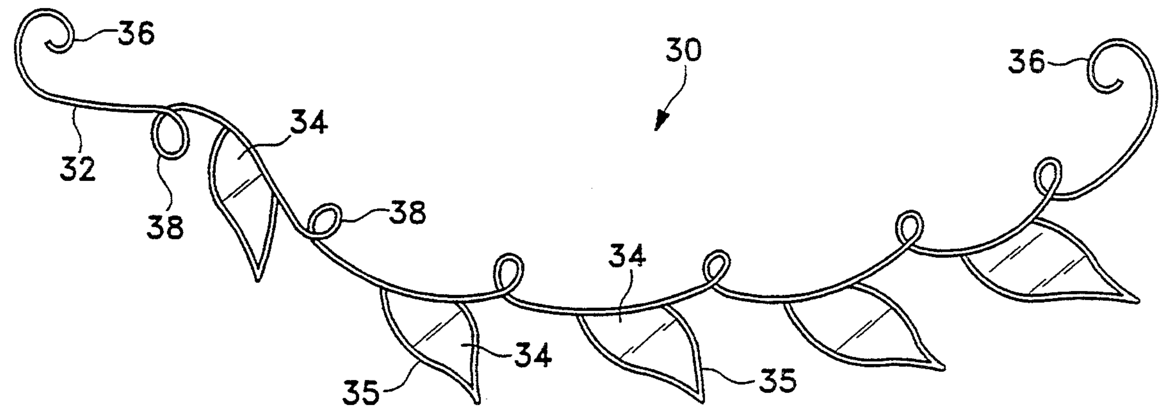
FIG. 3 is a front view of a preferred embodiment of a vine module.

FIG. 3 illustrates an exemplary embodiment of a vine module 30 as a decorative module, comprised of a length of a pliable material 32, such as copper wire, to which a preferred number of glass pieces 34 shaped like leaves (as an example) are permanently attached as feature elements, using traditional stained-glass means. Like the corner and center modules, the decorative modules such as the vine module 30 preferably have lead channel or metal foil (e.g. tinned copper) as a border 35 to hold the glass and to permit securing connectors 16. The ends of the pliable material 32 are curved at 36 to a desired shape to allow attachment to the desired location. Closed loops 38 are formed by twisting the pliable material 32 at various intervals for added module locations and to resemble a vine appearance.

A vine module 30 can be installed by simply hooking the open-ended curve 36 over any suitable point of attachment, such as the lamp shade shown in FIG. 10, then shaping as desired. Leaves 34 can be turned in any direction by grasping a leaf where it is permanently joined to the vine and gently twisting the pliable material to the desired angle. The other end of the vine can hang freely or also be attached by hooking to other suitable objects. Other modules and acceptable objects may be hooked through the closed loops 38 or hung anywhere along the vine as shown in FIG. 8 and FIG. 10.

Figure 4:
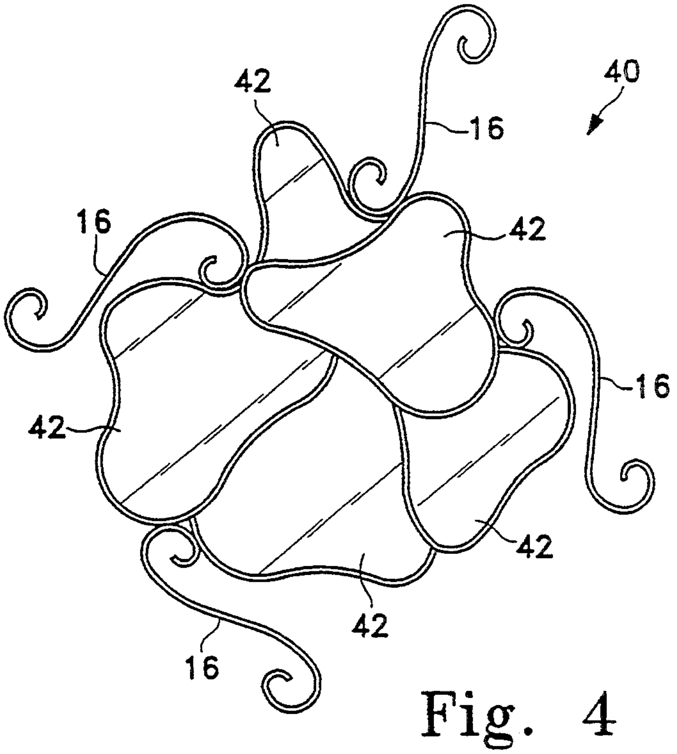
FIG. 4 is a front view of a preferred embodiment of a flower module.

FIG. 4 illustrates a sample embodiment of a flower module 40 comprising five pieces of glass 42 which are assembled using traditional means to resemble a flower as the feature element. Four individual connectors 16 are permanently attached in desired locations to allow the flower hanging flexibility as well as decor.

Figure 5:
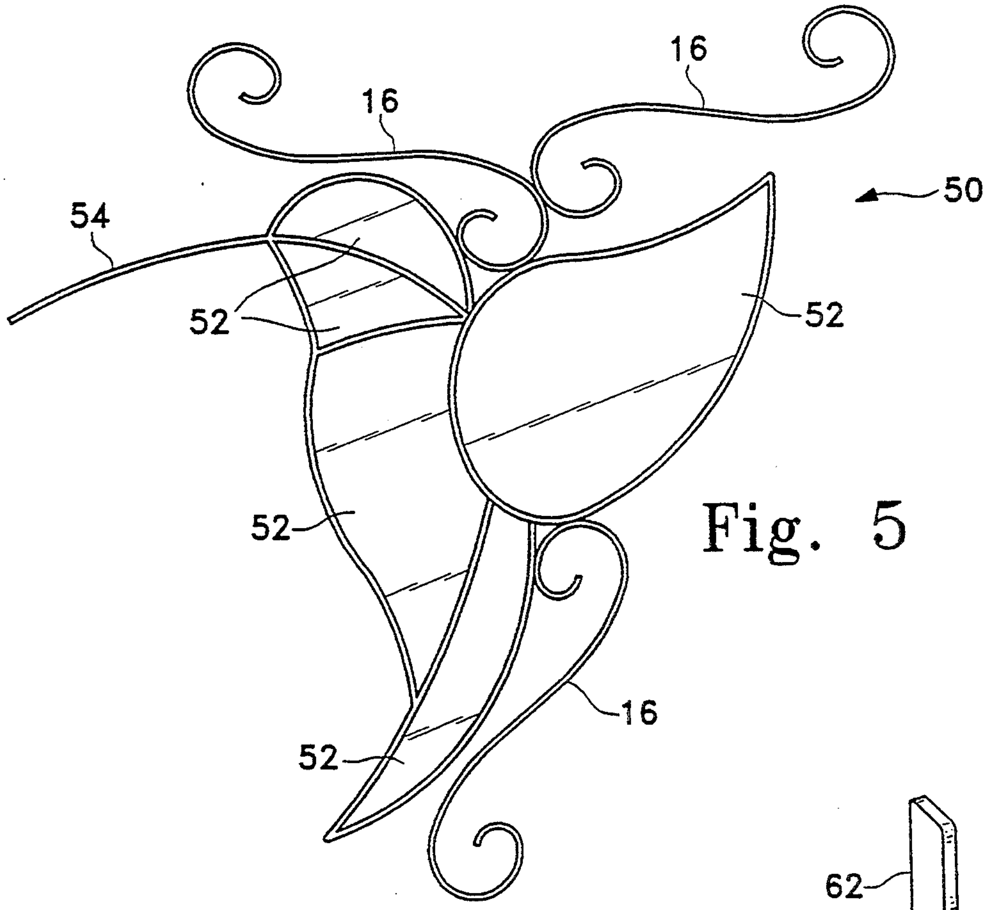
FIG. 5 is a front view of a preferred embodiment of a bird module.

FIG. 5 shows a sample embodiment of a bird module 50 comprising five pieces of glass 52 which are assembled using traditional means to resemble a hummingbird. A length of pliable material 54 is permanently attached to resemble a beak. Several individual connectors 16 are permanently attached to allow hanging flexibility and decor.

Figure 6:
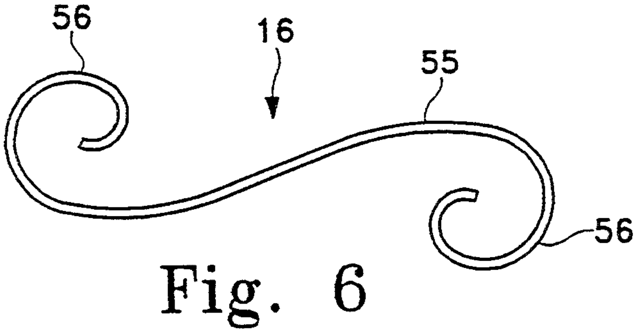
FIG. 6 is a front view of a preferred embodiment of an individual connector module.
Figure 7A:
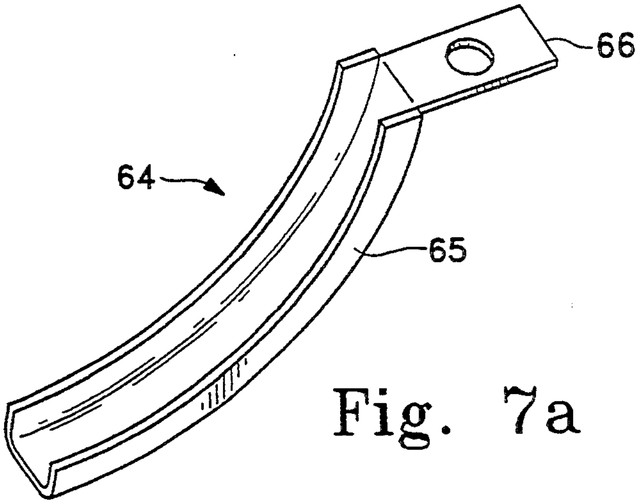

FIG. 6 shows a preferred form of individual connector 16, shown not connected to any decorative module, comprised of an arbitrary length of pliable material 55 which is formed to the desired shape leaving each end with an open curve 56 to allow hanging capabilities. These connectors 16 can be used to bridge between decorative modules or to connect them to mounting modules (10 or 26) or to fixed hooks or over mirrors, lamp shades etc.

Figure 7:
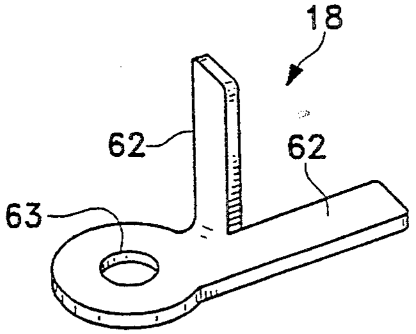
FIG. 7 illustrates in perspective a preferred embodiment of a mounting bracket to be attached to a module.

FIG. 7 illustrates one type of mounting bracket 18 which may be used on a module. One end has two legs 62 which can be bent to arbitrary angles for attachment to corner or center modules, by soldering. The opposite end comprises an extension having an opening 63 in the center through which a suitable fastener can be inserted.

FIG. *7a* shows an alternative bracket 64 which is often preferred for low-profile attachment of the corner modules to the interior of a window jamb, for example, and which can serve as the bracket 18 in FIGS. 1 and 2. The two-legged bracket 18 of FIG. 7 can in effect place a small spacer against the ceiling or window jamb which may be objectionable. The bracket 64 of FIG. *7a* has a flexible thin copper or lead channel 65 to be soldered preferably to the side edge of a module, over the foil which frames the glass. The end 66 can be bent as needed and has an opening for a fastener.

All of the modules can be attached to each other by simply interconnecting the connectors 16. Slightly twist the open end 56 of applicable connector as needed to achieve the desired degree of angularity so that each module will face in the desired direction. An individual connector may be used to start a scene on a mirror such as shown in FIG. 9 by bending the connectors 16 in half, as illustrated, twisting open its end curve 56 until it extends outward perpendicular to the mirror, then slipping the connector over the top of the mirror with about half of the connector being flat against the back of mirror. The other half is now an open-ended hanger, secured by itself, to which one or more modules may be added as desired. This open end 56 could also be closed or looped as shown on the vine module in FIG. 3. Another method to start a scene of modules with a connector is to form the open end curve 56 at one end into a small, closed loop through which a suitable fastener can be placed and mounted where desired. Individual connectors and vines can be hooked and/or twisted together to achieve unlimited possibilities in design placement.

FIG. 8 is a front view of a preferred embodiment of an example assembled module display comprised of four corner modules 10, one center mounting module 26, several vines 30, two flower modules 40 and one bird module 50.

FIG. 9 shows an example embodiment of a modular display comprised of one flower module 40, one bird module 50, and one individual connector 16 mounted on a mirror as discussed above.

FIG. 10 shows an example of a modular display comprised of one vine module 30 and one butterfly module 70 mounted on a lamp shade 71.

FIG. 11*a* shows an example of a butterfly module 70 comprised of four pieces of glass 72 which are assembled using traditional means to resemble a butterfly with wings slightly angled for added dimension. Two connectors 16 are permanently attached on outer edges of each side of the wings to permit attachments as well as decor. Two additional connectors 16 are permanently attached forming the appearance of legs and antennae as well as additional attachment possibilities.

FIG. 11*b* illustrates the butterfly module 70 with the two connectors 16 forming the antennae bent at a different angle to allow additional functions, such as holding a recipe or business card 74 by sandwiching between the body and the antennae. FIG. 11*b* shows the butterfly resting on a flat surface.

To further demonstrate the versatility of the modular system, FIGS. 11*a* and 11*b* show that the same butterfly module could be hung from any of its connectors. Alternatively, it can just sit on a flat surface, or with slight adjustments to the antennae it can be utilized as a recipe or card holder.

SUMMARY, RAMIFICATIONS, AND SCOPE

Accordingly, it is seen that the invention provides an economical way for the consumer to own genuine stained glass apparatus which can be installed by unskilled persons of almost any age, in virtually unlimited locations.

While the above description contains many specifics, these should not be construed as limitations on the scope of the invention, but rather as an exemplification of preferred embodiments. For example, limitless possibilities exist by combining various designs and dimensions or modules. Materials of different origin also expand possibilities. Almost any light-weight item, such as blown glass or jewels, can be incorporated into the overall stained glass concept by attaching to or with connectors; also, different metals can be used.

This invention allows a complete stained glass window appearance at a cost far lower than traditional stained glass assembly, and the assembly and modules are completely portable and do not require professional installation.

Modular displays can be installed in doorways, reach-through areas, on mirrors, lamps and shades, over knobs and hooks, etc.

Accordingly, the scope of the invention should be determined not by the embodiments illustrated, but by the appended claims and their legal equivalents.

I claim:

1. A hanging assembly of separate and discrete decorative glass modules, comprising:

a series of decorative glass modules, at least some of which differ in design and shape from others, each being generally planar in shape, the glass modules being interconnected in a generally planar, free-hanging array, the series of modules being positioned relative to one another so as to define open spaces between adjacent modules, the modules not being abutted edge to edge, hanging connection means for connecting the modules to each other in the hanging assembly, comprising hook connectors extending from module to module across open space between modules, the hook connectors comprising manually pliable, bendable members which connect adjacent modules only by hooking with the adjacent modules.

2. The apparatus of claim 1, further including at least one mounting module with means for securing the mounting module to a fixed structure such as a window frame or framed opening, and the mounting module including hanging connection means as on the decorative modules for hanging decorative glass modules from the mounting module.

3. The apparatus of claim 2, wherein the mounting modules include at least one corner module formed generally in an L share so as to permit its being fitted in and secured to a corner of a window opening or other framed opening.

4. The apparatus of claim 2, wherein each mounting module includes a mounting bracket with an eyelet for receiving a fastener, and wherein the mounting bracket comprises a thin metal channel having an extending end with an opening forming said eyelet, whereby the mounting bracket can be soldered onto the mounting module in essentially flush position on one side of the module, to avoid spacing the mounting module away from the window frame or other structure to which it is secured.

* * * * *

UNITED STATES PATENT AND TRADEMARK OFFICE

CERTIFICATE OF CORRECTION

PATENT NO. : 5,411,780

DATED : May 2, 1995

INVENTOR(S) : Pamela deBord Kaefer

It is certified that error appears in the above-indentified patent and that said Letters Patent is hereby corrected as shown below:

On the title page, item [19] should read --deBord Kaefer--
item [76] should read --Pamela deBord Kaefer--

Column 6, line 56, "share" should read --shape--

Signed and Sealed this

Twenty-fifth Day of July, 1995

Attest:

BRUCE LEHMAN

*Attesting Officer* *Commissioner of Patents and Trademarks*